United States Patent [19]

Moran et al.

[11] Patent Number: 4,616,259

[45] Date of Patent: Oct. 7, 1986

[54] INSTANT PHASE CORRECTION IN A PHASE-LOCKED LOOP

[75] Inventors: Brian P. Moran, Arlington Heights, Ill.; Edward W. Andrews, Brookfield; Stanford W. Miller, New Berlin, both of Wis.

[73] Assignee: General Electric Company, Schenectady, N.Y.

[21] Appl. No.: 604,580

[22] Filed: Apr. 27, 1984

[51] Int. Cl.[4] .............................................. H04N 5/04
[52] U.S. Cl. .................................... 358/148; 358/158; 358/150
[58] Field of Search .............. 358/158, 148, 150, 111; 375/118, 120; 331/1 A; 328/155; 307/511; 360/35

[56] References Cited

U.S. PATENT DOCUMENTS

| | | | |
|---|---|---|---|
| 4,120,000 | 10/1978 | Ninomiya | 358/148 |
| 4,123,786 | 10/1978 | Cramer | 358/148 |
| 4,203,076 | 5/1980 | Yamashita | 358/158 |
| 4,316,219 | 2/1982 | Smith et al. | 358/150 |
| 4,468,696 | 8/1984 | Stone | 358/150 |

Primary Examiner—Tommy P. Chin
Assistant Examiner—David E. Harvey
Attorney, Agent, or Firm—Fuller, House & Hohenfeldt

[57] ABSTRACT

In cases where the reference signal pulses supplied to one input of the phase detector of a phase-locked loop (PLL) may shift in phase significantly, the PLL may not be able to lock-in quickly enough to the apparent input pulse frequency change. In video monitor circuits where digital counters are clocked by the output frequency of the PLL, for example, the momentary loss of synchronism can cause horizontal scanning of the monitor screen to start too early or too late. A circuit is provided that lets the PLL make normal phase and frequency adjustments during a predetermined period during which counter reset is disabled. The circuit provides a window before and after this period during which counter reset is enabled. A reference pulse with a substantial phase error falls within the window. If three conditions are met, namely, the Reset Enable window exists, the reference pulse occurred within the window and the scan is near the bottom of the monitor screen, then a counter reset to zero signal is produced.

3 Claims, 3 Drawing Figures

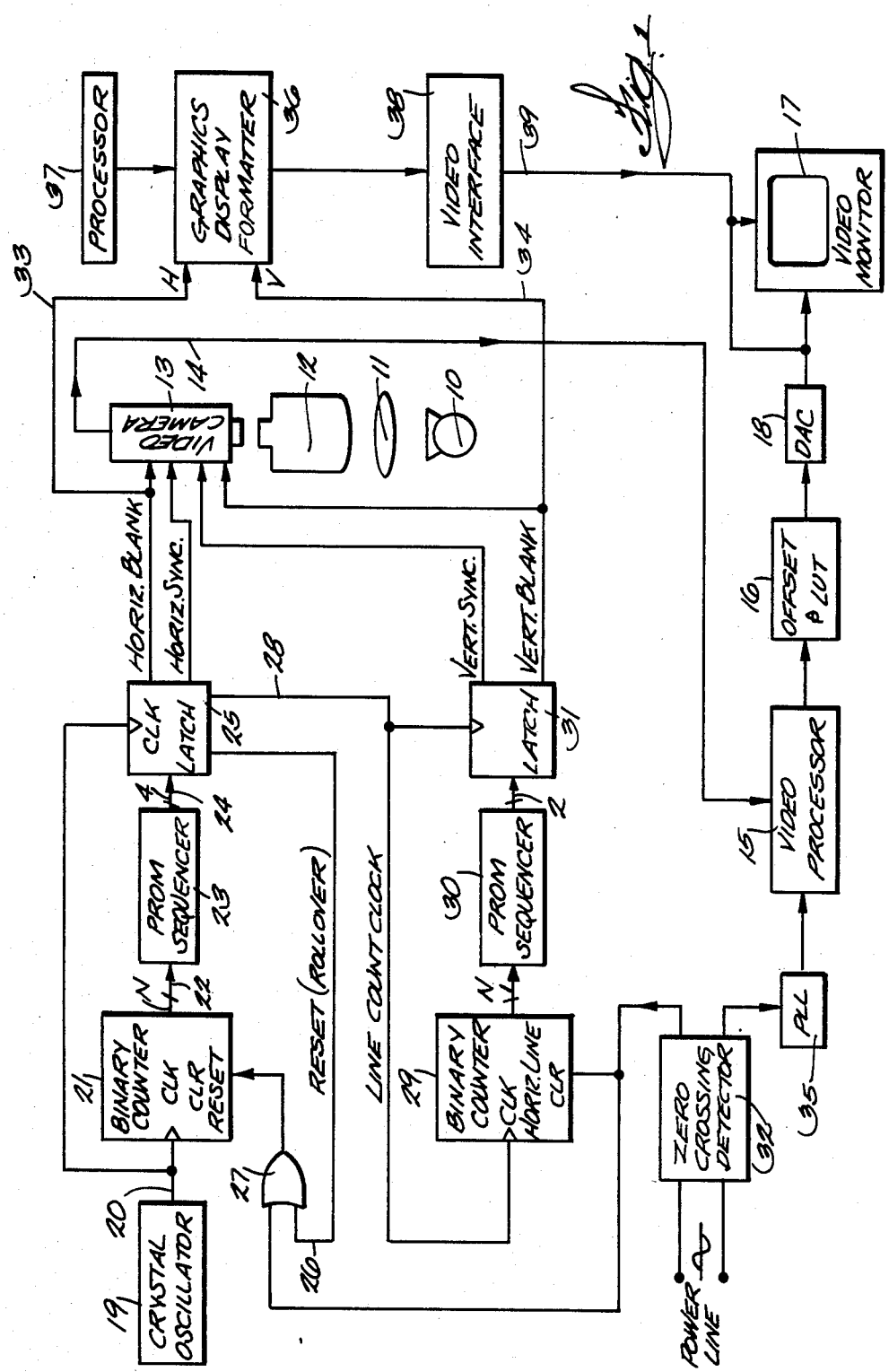

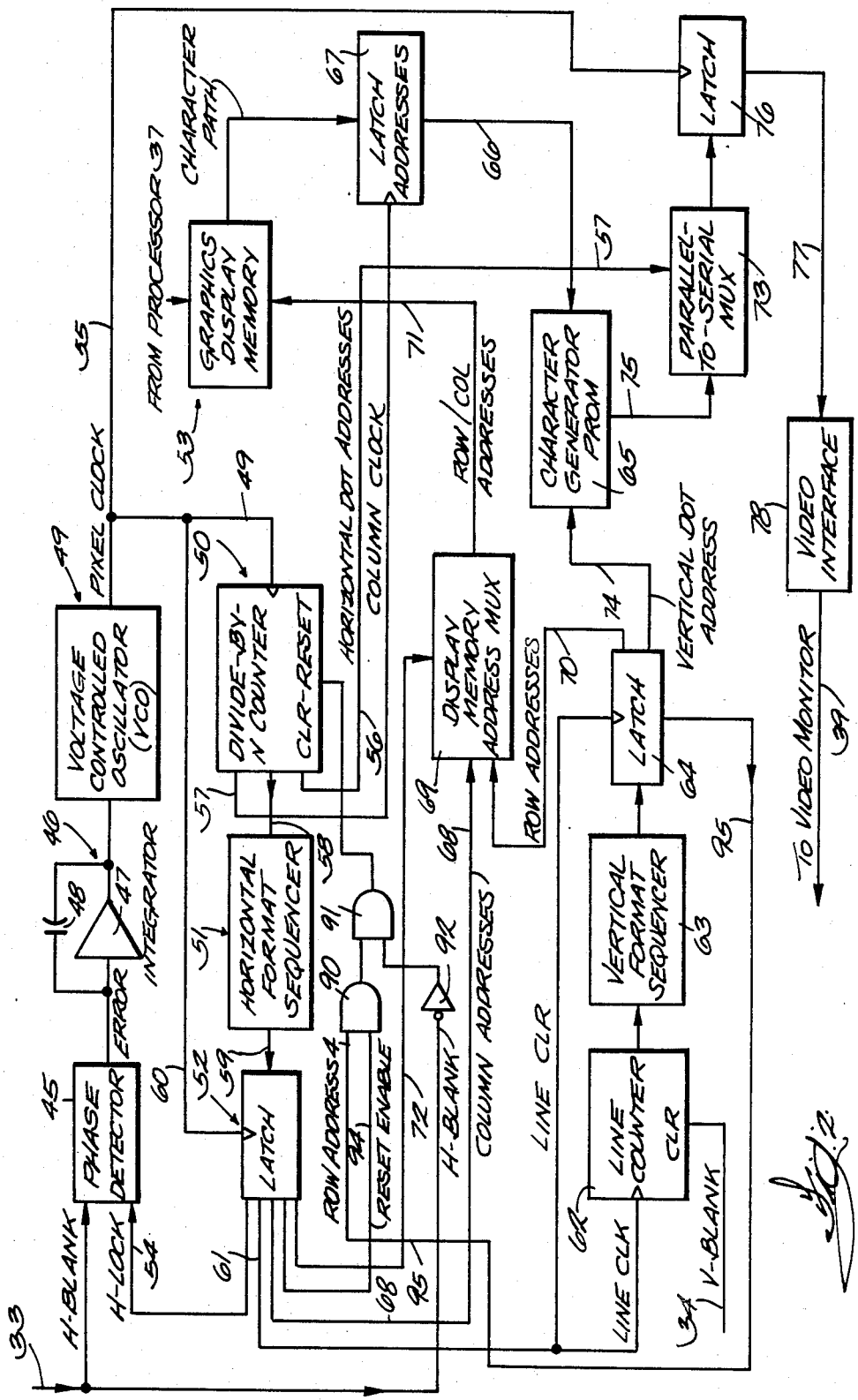

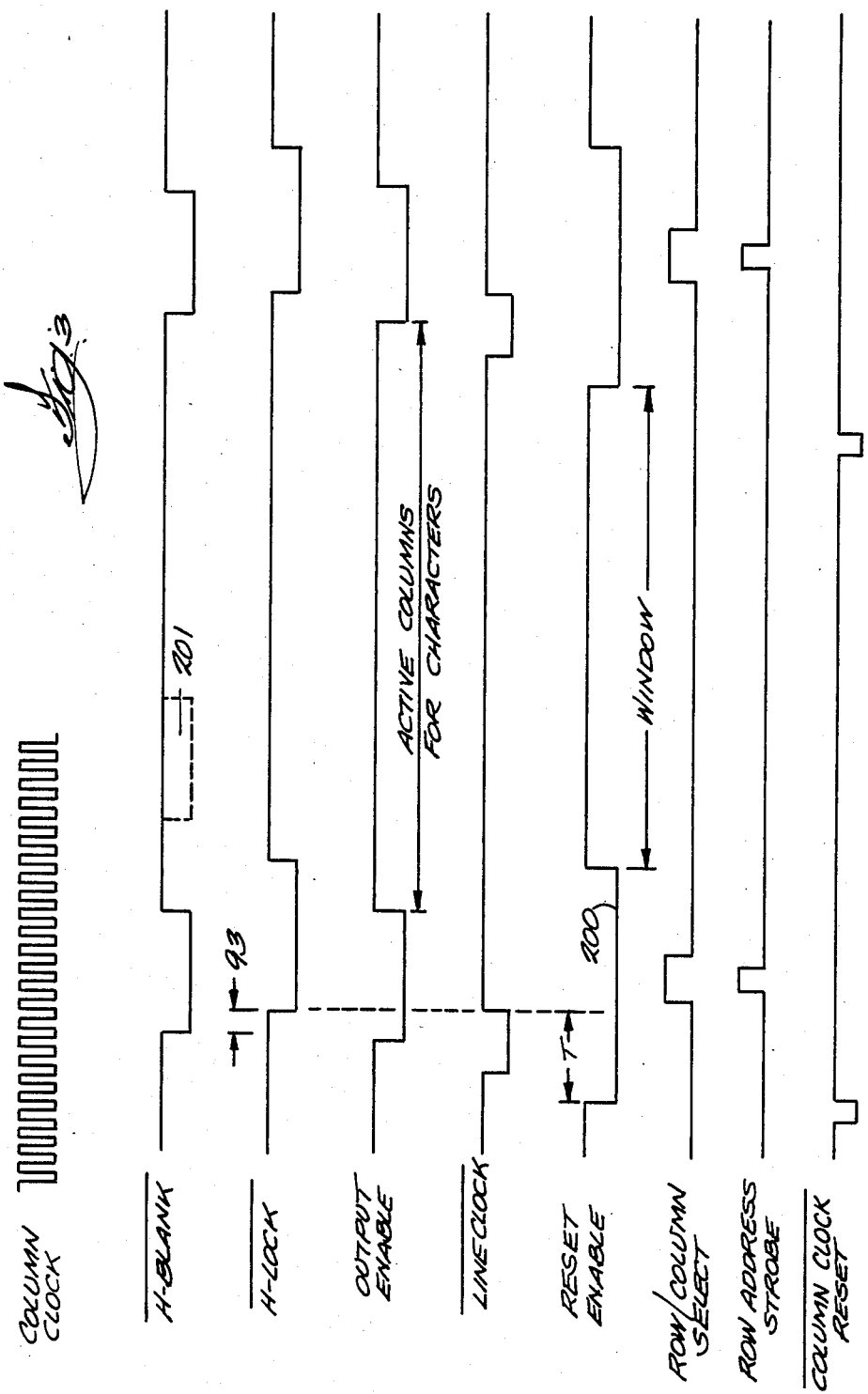

INSTANT PHASE CORRECTION IN A PHASE-LOCKED LOOP

BACKGROUND OF THE INVENTION

This invention pertains to a circuit for compensating errors in a phase-locked loop.

In video systems for processing and displaying image information, individual phase-locked loops are commonly used to keep several subsystems in a fixed phase and frequency relationship to a reference signal such as a zero crossing of the power line waveform. In some cases such as when a sequence of video images are subtracted from one another, it is necessary to keep all subsystems in perfect synchronism so the picture elements (pixels) in all images will be exactly coincident with each other, in which case no artifacts in the difference image would result. However, in systems that require high phase and frequency stability between subsystems and that use phase-locked loops, periodic phase errors can occur. It has been discovered that these errors are due to timing errors in the power line frequency itself. Until the invention described herein was made, no one seemed to account for the fact that zero crossings of the power line frequency sometimes shifted by significant amounts before or after the zero crossing that was assumed to occur at exactly one-sixtieth or one-fiftieth of a second intervals. These phase errors occur even though all electric power generating stations in a country are synchronized by a master clock which detects and makes corrections for the errors periodically. It has been observed that if a heavy electric load has been connected to or disconnected from a power system at an unknown place in a given locale, phase errors frequently result. These errors do not affect ordinary television systems nor other communication systems adversely since in them usually a sequence of electrical actions follow occurrence of a zero crossing in a fixed time relationship and it does not make any difference when the crossing occurs since the transmitters and receivers will be similarly affected. However, in phase-locked systems where perfect coincidence of pixels between successive images is absolutely necessary, for example, the phase-locked loops cannot respond fast enough to correct for the power line phase error and temporary loss of the proper timing relationships between subsystems results.

One example, used to illustrate the new power line phase error correcting system constituting the present invention is where graphics must be written on a cathode ray tube (CRT) screen or monitor on which image data is also being written and displayed simultaneously. Here coincidence of corresponding pixels in successive images is an absolute requirement. In an effort to insure coincidence, the video camera system timing was based on the stable frequency of a crystal-controlled oscillator. This assured that the time intervals between every horizontal raster line were the same since the frequency precision of the crystal-controlled oscillator is better than the power line synchronized oscillator. In other words, in this case, the sequence of horizontal raster lines was initiated by occurrence of a power line zero crossing but from that time on the horizontal synchronizing (sync) and blanking pulses were governed by the crystal oscillator so the only effect of a zero crossing error was that the vertical scan would be terminated slightly early or slightly late so that the zero crossing reset signal might occur before or after the last intended horizontal raster line was complete. In this system, a digital video processor (DVP) processes the digitized video signals. The DVP employs a phase-locked loop to maintain synchronism with the camera and is controlled by horizontal and vertical sync signals derived from the video camera under crystal control. Thus, it would maintain phase and frequency relationship with the camera very well. However, in the same system there is a graphics display subsystem for displaying dot-matrix graphics on the CRT screen concurrently with image data. The graphics display was also locked by means of a phase-locked loop to the video camera and the input frequency to this loop is the horizontal blanking pulse frequency. Before the present invention was employed, when a power line phase error occurred, the phase-locked loop sensed it as an error in its own frequency and tried to correct it, which resulted in the graphics becoming distorted and torn at the top of the raster. The present invention overcomes this problem in the described illustrative system but is applicable to a variety of systems wherein instantaneous phase correction in a phase-locked loop is necessary.

SUMMARY OF THE INVENTION

In accordance with the invention, in a system having a phase-locked loop driven by a pulse train, the maximum timing error in power line zero crossing that is likely to occur is selected or determined. Means are provided so that when a timing error in excess of a predetermined amount of error occurs counters which use the output of the phase detector to develop video timing signals, such as for a graphics display system, are prohibited from being reset until two or, possibly three, conditions are met. Thus, in a phase-locked loop system which is driven by horizontal blankihg (H-BLANK) signals, for example, a Reset Enable signal is set and its duration constitutes a window in which a horizontal blanking signal is waited for befor reset can occur. Thus, the system is always compeled to be in synchronism with the driving signals such as H-BLANK in this illustrative application of the invention. In addition, the lock pulse or feedback pulse from the output of the voltage controlled oscillator in the phase-locked loop is generated at a time which assures that it will occur within the window in which case there is no excessive delay between the H-BLANK pulse and the H-LOCK pulse. Hence, the phase detector of the phase-locked loop does not sense any great difference between the H-BLANK and H-LOCK pulses so it does not undertake to correct for a substantial error as it otherwise would.

Another feature of the invention is to disable the reset circuit during power-up to allow normal operation until the phase-locked loop's (PLL) internal voltage controlled oscillator (VCO) attains the proper frequency in order to prevent continuous reset dye to frequency mismatch rather than phase errors. The favorable result is that the graphics appear on the monitor screen without distortion or tearing during power-up.

An illustrative example of the new method and means of generating instantaneous phase correction within a phase-locked loop will now be described in detail in reference to the drawings.

DESCRIPTION OF THE DRAWINGS

FIG. 1 is a block diagram of a typical system that uses more than one phase-locked loop;

FIG. 2 is a more detailed block diagram of the phase-locked loop controlled graphics display system which is shown as a single block in FIG. 1; and FIG. 3 shows the timing diagrams relative to the operation of the graphics display formatter.

DESCRIPTION OF THE PREFERRED EMBODIMENT

Refer to FIG. 1 for an overview of an illustrative system, particularly an imaging system in which the new method and means of generating instantaneous phase correction within a phase-locked loop is employed. For the sake of example, x-ray images are to be produced in a manner such as to permit images of the anatomy to be variously weighted and subtracted from one another to yield a difference image that exhibits the interior contours of a blood vessel in accordance with digital subtraction angiography procedures. Item 10 represents an x-ray tube and a body undergoing a digital subtraction angiography is represented by the ellipse marked 11. The x-ray image, resulting from an exposure of the body to the x-ray beam from the tube, is converted to an optical image in an electronic image intensifier 12. A video camera 13 converts the optical images to analog video signals which are output, by way of line 14, to a digital video processor (DVP) 15. The manner in which the video signals are processed to produce a series of separate images for the various subtraction steps is elaborated in pending application Ser. No. 400,552, filed July 21, 1982. The cited application is assigned to the same assignee as the present invention. It is sufficient for present purposes to recognize that the problem is to maintain exact coincidence between corresponding pixels in the several images to prevent artifacts in the ultimate subtracted image. In any case, the digital video signals are output from DVP 15 to a well known circuit, represented by the block marked 16, which introduces an offset in the digital video signals and, by means of a look-up table (LUT), modifies the video signals so the full dynamic range of the video monitor 17 will be used. Of course, the digital pixel signals representative of the subtracted image are converted to analog video signals in a digital-to-analog converter (DAC) 18. The invention facilitates displaying graphic information on the screen of a video monitor 17 concurrently with the visible x-ray image data.

Because it is necessary to assure that the number of pixels in every horizontal scan line will be the same and that the time between horizontal scan lines in the raster will be the same, it has been found necessary to generate the video timing signals with a crystal-based oscillator which is symbolized in the upper left of FIG. 1 by the block marked 19. The high frequency output pulse train from crystal oscillator 19 is supplied by way of a line 20 to the clock (CLK) signal input of a binary counter represented by the block marked 21. Binary counter 21 counts the clock pulses continuously and outputs the current count in digital form on multiple lines 22. The output states of counter 21 constitute addresses to a programmable read-only memory (PROM) 23 which is adapted to perform as a sequencer. For instance, when the first effective address arrives, the PROM 23 may yield a horizontal blanking pulse signal on its output lines 24 which signal is latched in a latch represented by the block marked 25. The next effective address will yield a horizontal sync signal from the PROM. These signals are supplied to video camera 13 to control its timing. In the present system, assume that the duration of a horizontal raster line from occurrence of a horizontal sync signal to a horizontal blanking signal is nominally 43 microseconds. When the pulse count from the crystal oscillator corresponds to 43 microseconds, the counter 21 rolls over in which case a counter reset signal is delivered from latch 25 to an input terminal 26 of an OR gate 27. Every time a horizontal blanking pulse occurs it is indicative of the end of a horizontal line and a corresponding signal is delivered over a line marked 28 and labeled line count clock. This clock (CLK) signal is input to a binary counter 29 whose purpose is to count the number of horizontal raster lines such that its output states are representative of the raster horizontal line count. The output states of binary counter 29 are addresses to a PROM sequencer 30 which, when a certain line count is reached corresponding to the number at the bottom of the raster such as 535 lines, produces a vertical blanking signal and subsequently a vertical sync signal which are supplied to the video camera 13 for controlling the duration of its frames. The counters are reset synchronously on each power line zero crossing in response to a signal from a known type of zero crossing detector symbolized by the block marked 32 in order to maintain a power line locked frame rate. The vertical sync and BLANK signals that are output from PROM sequencer 30 are, of course, latched in a latch 31 after they are produced so that they can be clocked out at the proper time.

The digital video processor 15 contains a phase-locked loop (PLL) which is shown isolated and represented by the block marked 35. All of the video timing signals for DVP 15 are referenced to zero crossings by way of PLL 35.

The graphics display formatter 36, shown in block form in FIG. 1, contains a PLL whose operation will be described in substantial detail subsequently in reference to FIGS. 2 and 3. For the moment it is sufficient to recognize that a processor 37 is used to provide the data representative of the graphics which are desired to be displayed along with the optical version of the x-ray image on the video monitor screen. After suitable signal processing in the formatter, the signals for modulating the video monitor scanning beam to write the graphics are coupled to the monitor through a video interface 38 whose output line 39 supplies the analog video signals representative of the graphics to the monitor.

Refer now to FIG. 2 where the graphics display formatter 36 is shown in greater detail. The horizontal blanking (H-BLANK) and vertical blanking (V-BLANK) signals from the video camera system are inputs to the graphics display formatter in FIG. 2 on lines 33 and 34, respectively. The problem that the invention solves arises because the formatter of FIG. 2 contains a phase-locked loop (PLL) that is intended to keep the graphics display formatter in perfect frequency and phase relationship with the video camera timing signals. The problem is that the PLL in the formatter cannot respond or correct fast enough to account for the small variations in zero crossing times which bring about reset or the beginning of the topmost horizontal line scan. The phase-locked loop in the formatter is conventional to the extent that it comprises a phase detector 45, an error integrator 46 which includes an amplifier 47 and integrating capacitor 48, a voltage controlled oscillator (VCO) 49 and a feedback circuit including a divide-by-N counter 50, a horizontal format sequencer 51 implemented by a group of PROMs, and a latch 52. The PLL controls the display of graphics on the screen of the video monitor 15. Graphics data, as previously mentioned, is supplied from processor 37 in FIG. 1 to the graphics display formatter 36 and, more particularly, to the graphics display memory 53 in FIG. 2. Display memory 53 for the character data is a random access memory.

The error signal input on line 54 to the phase detector 45 in the PLL circuit is marked H-LOCK. The phase detector compares the position of the falling edges of the reference input H-BLANK and feedback or lock signal H-LOCK and produces an output pulse during the difference period. This pulse is used as a control input to the error integrator 46 to maintain lock. The error integrator controls the level of the frequency control input of VCO 49. The integrator adjusts this level in response to the phase error pulse from the phase detector 45 as required to maintain the loop in lock at the desired phase error condition.

VCO 49 generates the high frequency pixel clock signal used to synchronize display timing. The frequency of the signal, when the loop is locked, is equal to N times the horizontal line rate where N is the modulus of divide-by-N counter 50. By way of example and not limitation, the pixel clock frequency is typically high such as in a range of 10 to 15 MHz. The pixel clock pulse signals appear on line 55. By way of example and not limitation, there may be about 512 pixel clock pulses and, the same number of pixels per horizontal video scan line.

Divide-by-N counter 50 divides the VCO 49 output, that is, the pixel clock, by a defined modulus N to produce the feedback signal horizontal lock (H-LOCK). In lock, the VCO 50 output is adjusted such that the frequency of H-LOCK is equal to the frequency of the reference input H-BLANK, thereby dividing each horizontal line into N states. The counter 50 outputs can then be decoded to produce the various timing signals required by the display during each horizontal line. Since in the described use of the invention dot matrix characters are displayed, one of the output states constitutes the horizontal dot addresses which are output from the counter on multiple lines 56. Another of the outputs from the counter 50 is the column clock pulse train which appears on output line 57. It determines the number of columns of pixels across the horizontal lines. Another output line 58 from the counter 50 carries digital numbers constituting addresses to horizontal format PROMs comprising sequencer 51. The video display format can be looked upon as being divided into columns and rows of pixels which must be defined. Moreover, since the graphics characters are in dot matrix form, the positions of the dots that define the horizontal and vertical lines of a character must be defined within each column. Assuming that a 7×9 dot matrix format is used for each character, the dots for a character would appear on 9 consecutive horizontal lines. The horizontal dot addresses on line 56 from the counter indicate the positions of the dots and the columns are indicated by the addresses on line 57. How these addresses are used will be discussed shortly hereinafter. Thus, the function of the divide-by-N counter 50 is implemented in two stages. The first stage is the dot counter which divides the pixel clock signal by the number of pixels per character row, 9 for example, and generates the intermediate clock signal, column clock. The column clock is in turn used by a second state consisting of the column counter and horizontal format sequencer 51 which further divides the clock signal by the number of characters per line and also outputs the feedback signal of H-LOCK of the phase-locked loop by way of lines 59, latch 52 and line 54. The pixel clock signal is an input by way of line 60 to latch 52. The latch is used to assure that all states or outputs from horizontal format sequencer 51 are properly timed. One of the signals from horizontal format sequencer 51 is indicative of H-BLANK and permits maintaining the count of the horizontal lines comprising a video raster. This signal is output from latch 52 on line 61. This line clock signal is, likewise, input to a counter of the horizontal raster lines, namely, the line counter which is designated by the block marked 62. The vertical blanking signal (V-BLANK) is also an input to line counter 62. Each time a vertical blank pulse is delivered from the video camera in FIG. 1 by way of line 34, horizontal line counter 62 is cleared and then, in accordance with one feature of the invention which will be discussed in more detail later, after a delay of a predetermined number of horizontal lines such as four lines, the line counter begins counting horizontal lines again. The line counter 62 is a binary counter which increments once for each cycle of the column counter where a cycle includes a number of counts or pixels in a single horizontal video line. Since the column counter completes one cycle for each horizontal raster line, the line counter 62 essentially counts raster lines. The outputs of the counter 62 then represent the current raster line being scanned. Following the reset interval, line counter 62 begins to count raster lines and continues until the next vertical blanking interval occurs. The line counter binary number output signals are inputs to a vertical format sequencer indicated by the block marked 63. The sequencer 63 is comprised of binary counters and PROMs, not shown. The PROMs decode the counter outputs and generate vertical dot addresses. The addresses are fed to a latch indicated by the block marked 64 which is clocked by the line clock signal to deliver the vertical dot addresses to a character generator PROM 65. This is a conventional column-scanned character generator for dot matrix display. Addresses to the characters are fed in to the character generator 65 by way of multiple lines 66. The character data or addresses, of course, are clocked out of the graphics display memory to a latch 67 from which the addresses are clocked out by the column clock signals which are determined by divide-by-N counter 50 and are supplied to latch 67 by way of line 57. The column addresses are produced by the horizontal format sequencer 51 in the PLL circuitry. The column addresses are output from latch 52 by way of multiple lines 68 to a display memory address multiplexer (MUX) 69. The column addresses are binary numbers that specify the column in which the scanning beam of the video monitor resides at any given instant. The row addresses, that is, the addresses that specify the horizontal line that is being scanned at present is supplied as an output from latch 64 by way of multiple lines 70. The output from display memory address MUX 69 on multiple lines 71 carries the row and column addresses which address the graphics display memory 53 to access from the display memory the character that is assigned to the particular row and column at those addresses. MUX 69 is switched back and forth between the row addresses, lines 70, and the column addresses, lines 68, in order to put the row and column addresses that relate to each other on output lines 71. The row and column addresses are gated and strobed by signals developed in horizontal format sequencer 51 and transmitted through latch 52 and to its output line 72. The strobe signals time the switching of MUX 69. The horzontal dot addresses that specify where a dot in a line forming a character should be located, as previously mentioned, are output by way of lines 56 from divide-by-N counter 50. The horizontal dot addresses are input to a parallel-to-serial MUX 73.

The operation of the character generator circuitry is as follows. The row and column addresses are supplied in their time slot to the graphics display memory which causes the memory to output character data, that is, the data which addresses the location of the character in the character generator PROM 65. The column clock signal gates these addresses out of latch 67 to the character generator PROM 65. The horizontal dot addresses, that is, the points within a column and on a horizontal line that are to be written to form a character are input to the parallel-to-serial MUX 73 by way of line 57. The vertical format sequencer 63 produces the vertical dot addresses and these are input by way of lines 74 to character generator PROM 65. The vertical dot address informs the character generator PROM as to the point or portion in the character that the scanning beam is on. The parallel dot pattern that is output from character generator PROM 65 is input by way of multiple lines 75 to the parallel-to-serial MUX 73. As the dot data are formed, they are converted to serial form by MUX 73 and delivered to a latch 76. These data are clocked out of latch 76 by pixel clock signals which are supplied by way of line 55. The digital data out of latch 76 which locates the dots forming a horizontal segment of a dot matrix character on the correct horizontal scan line are supplied by way of lines 77 to video interface 78 in serial form. The video interface is conventional and among other things converts the digital data to analog video signals which are supplied to the video monitor 15 by way of line 39 as was previously indicated in connection with discussing FIG. 1. Every time a dot comprising a character is to be displayed, the analog video signals cause the scanning beam of the video monitor 15 to be modulated whiter than white, by 110% for example, so. that the dot overrides any image on which it is superimposed on the video monitor screen.

Ordinarily, characters are not written over the entire display screen area nor the entire image that is being displayed. Rather, the characters are usually written to one side or above or below the displayed image. Accordingly, less than the total number of columns of the screen will contain characters. In the character generator scheme just described, it should be evident that the location of the characters is governed by processor 37 which locates the character data at addressable locations in graphics display memory 53 so as their addresses come up they are displayed.

The manner of displaying dot matrix characters thus far described is largely conventional. It is just one example of a case where very precise timing is required and where timing variances can occur because of variances in the occurrence of reference signals such as detected zero crossings of the powerline waveform.

The invention pertains to correcting for errors that would occur in the counting of horizontal lines as a result of the phase-locked loop in the display formatter of FIG. 2 being incapable of correcting fast enough for a phase shift of the reference for each blank signal that results from a variance in the zero crossing signal which resets the horizontal blanking signal generator in FIG. 1. In other words, in this particular example, the H-BLANK signals to the FIG. 2 display formatter may come in early or late as a result of zero crossing shifts in which case, if the H-BLANK signal were early, for example, the divide-by-N counter 50 would just go on counting until a reset occurred indicative of the last complete horizontal line having been scanned on the video monitor screen. However, binary counter 21 would have been reset earlier by the zero crossing so that the H-BLANK signals to the camera for the frame that followed that zero crossing would end earlier which means that fewer than the total expected normal of horizontal lines would be scanned by the video monitor for the particular frame that followed the inaccurate zero crossing. In accordance with the invention, when there is a substantial time error or variance in zero crossing, the divide-by-N counter 50 is instantaneously reset. This may cut off one or more of the lowermost video monitor scan lines but this is of no consequence since these lines would be lost usually below the bezel that frames the video monitor CRT screen. The result is that everything drops back in sync again. Formerly, when the H-BLANK or other reference signal to the PLL underwent a large phase shift due to a zero crossing error, the PLL would treat the error as if there were a large difference between H-BLANK and H-LOCK and the voltage controlled oscillator would respond by developing a large error signal that would normally be used to establish lock again. The large error signal would make the PLL unstable and it would not stabilize again until, possibly, 10 or more horizontal lines would be scanned from the top of the monitor screen. This is the region in which the characters are written on the screen and they would be distorted or torn. In accordance with the invention, when there is an H-BLANK or reference signal error in excess of a predetermined amount stability is obtained within a very first horizontal scan line at the top of the screen. Of course, the PLL must remain capable of adjusting the feedback signal from the VCO to account for insignificant variations in the timing of the H-BLANK signals. In accordance with the invention, a time interval is defined by the horizontal format sequencer 51 during which reset of the counter is disabled and during this interval the PLL can function in the normal way it does to lock in on a given frequency. However, in accordance with the invention, a window is set by the format sequencer at the end of this interval. The window corresponds to a Reset Enable signal. If the reference H-BLANK signal occurs within this window, resulting from a significant zero crossing timing error, the reset of divide-by-N counter 50 takes place. A Reset Enable window is determined or set by programming it into a PROM in sequencer 51. AND gates 90 and 91 and inverter 92 in FIG. 2 implement the conditional reset. Refer now to the FIG. 3 timing diagram. The top line shows the column clock pulse train which determines the column frequency or number of columns across the horizontal scan lines. The next line in the timing diagram is the H-BLANK reference signal which is one input to AND gate 91. This signal is active low and shifts left and right due to shifts in the zero crossing times. The next line in the timing diagram shows the H-LOCK signals that are input to phase detector 45 on line 54. The amount of error in time permissible between the H-BLANK and H-LOCK signals to have the PLL lock on a particular frequency is indicated by the lines 93 in FIG. 3. By way of example and not limitation, this might be about 6 microseconds. The next line in the timing diagram shows the output enable signals which are not particularly relevant to the correction process but are illustrated to show the beginning and the end of the time in which the selected number of columns for character display persists. The active display time or number of columns exists between output enable pulses and is indicated on this line in FIG. 3. The next line in the FIG. 3 timing diagram is the active low line for the line count clock pulse train which was discussed earlier. This is the input signal to horizontal line counter 62 in FIG. 2. Now to improve understanding of the invention that results from demonstrating with concrete numbers, assume, for example, that the duration of the H-BLANK signals is on the order of 11 microseconds. The phase delay for each LOCK signal delay as compared with H-BLANK might be less than or equal to about 7 microseconds. The H-LOCK signals are controlled to be about 12.8 microseconds in duration by the horizontal format sequencer 51. The Reset Enable signal is active high and is set by the horizontal format sequencer 51 and is delivered by way of a line 94 in FIG. 2 to one input of AND gate 90. In FIG. 3, when the Reset Enable is low or inactive as indicated by the time interval marked 200 in FIG. 3, reset of divide-by-N counter 50 is actually disabled. Thus, when the Reset Enable signal is low a time interval is set during which, if the H-BLANK signal falls within this interval, the PLL can execute its normal frequency stabilizing or correction function. In FIG. 3 the Reset Enable signal ends about 8 microseconds before the H-LOCK signal occurs in this example and this time is indicated by the letter T in the FIG. 3 timing diagram. In addition, the Reset Enable signal is set to start about 12 microseconds beyond the time T duration. This time of about 20 microseconds is when the Reset Enable signal is low or off or disabled and allows for the normal operation of the phase-locked loop as just mentioned. In other words, the Reset Enable signal is programmed into the PROMs of the horizontal format sequencer 51 and the Reset Enable signal constitutes the window duration.

Now assume that the H-BLANK signal in FIG. 3 occurred late due to a zero crossing time variance. The late H-BLANK signal is indicated by the dashed outline of it marked 201. This illustrative late signal has occurred during the window which is the time during which counter 50 reset is enabled. As a consequence, the counter is reset to zero.

In accordance with the invention, three conditions are required before a reset of divide-by-N counter 50 will occur. The first condition is that the Reset Enable window must exist. The second condition is that no reset can occur unless the H-BLANK signal is within the window. The third condition is that the scan of the video monitor must be in the last quarter of the CRT screen. Now, if Reset Enable exists, there will be one high logic level input to AND gate 90 in FIG. 2. Now, for the moment, assume that the output pin of inverter 92, connected to one input of AND gate 91, is high because H-BLANK has occurred. If the upper input to AND gate 91 is high as a result of Reset Enable being set and the video scan is in the last quarter of the monitor screen so the other input to AND gate 90 will be at a logic high, then there will be a high output signal from AND gate 91 and the divide-by-N counter 50 will clear or reset to zero. Thus, any time an incoming or reference H-BLANK signal occurs inside of this window as it does when there is a significant shift in the zero crossing time, the PLL divide-by-N counter is reset. Since the PLL logic generates the feedback pulse, H-LOCK, the loop makes an internal instantaneous phase adjustment approximately equal to the change of the input signal, H-BLANK, and the loop remains locked. Thus, H-BLANK can drift around outside of the window and yet the PLL will correct itself in the normal way. The frequency may be correct even if there is a slow temperature drift but the PLL can cope with this. It is only the instantaneous phase change that the PLL could not correct for in a timely manner.

As indicated earlier, the third condition that must exist before divide-by-N counter 50 can be reset involves the use of both AND gates 90 and 91. To assure that reset will only occur when the scan is on the last quarter of the monitor screen, the Reset Enable signal is ANDed with row address bit 4. For row address bit 4 to be set, the scan must be near the bottom of the screen. This bit is obtained through latch 64 and is sent to one input of AND gate 90 by way of line 95. A large phase and frequency error will usually occur during system power-up. During this time Reset Enable and H-BLANK would occur at any time even though the scan would not be at the bottom of the screen. So requiring bit 4 to be set keeps the reset disabled until the scan is at the bottom of the screen. If it were not for the bottom of the screen requirement, it would take a long time, on the order of tens of seconds, for the PLL to lock in because it would keep on resetting until it finally matched the H-LOCK and H-BLANK signals sufficiently close to lock in and the image display would be unstable during that time.

We claim:

1. In combination, a phase-locked loop (PLL), a video monitor having a raster scanned screen and input means for video signals representative of an image, and a video camera for producing said video signals, said phase-locked loop comprising a controlled oscillator means for generating pixel clock pulses whose frequency is varied by input of a control signal to said oscillator means, said frequency corresponding to the frequency of picture elements (pixels) in a horizontal raster line, phase detector means having an input for reference signals which have a frequency corresponding to the frequency of a horizontal blanking signal of said video camera, and another input for receiving lock signals, feedback circuit means including divide-by-N counter means having an input for said pixel clock pulses and an output, said counter means for counting said pixel clock pulses to provide at the output digital values corresponding to the count of said pixel clock pulses said phase detector means comparing the phase of said lock and said reference signals and producing said control signal for the oscillator means corresponding to the detected phase and frequency difference error between said lock and said reference signals, said oscillator means responding to said control signal by changing the frequency of the pixel clock pulses to reduce said difference error when the difference error is within predetermined limits, said feedback circuit means further including a sequencer means having input means for said digital values provided by said counter means and responding to the counts represented by said digital values by producing a plurality of timing signals including said lock signals having substantially the same frequency as said reference signals, counter means reset enable timing signals of predetermined duration and the complement of said reset enable signals such that if said reference signals occur during existence of said complement signals said difference error is within said limits and reset of said counter means is disabled and said control signal resulting from occurrence of said difference error is effective to change said frequency of the pixel clock pulses to reduce said difference error between said reference and lock signals, gate means having input means for said reset enable signals and for said reference signals, said gate means producing a counter means reset signal that is supplied to said counter means for resetting said counter means, means for producing video signals representative of characters and for mixing the character signals with said video signals representative of an image, and means for coupling said mixed video signals to said input means of said monitor for effecting display of said mixed video signals on the monitor, and means for generating a scan position signal indicative of the scan nearing the bottom of the raster, and means for coupling said scan position signal to said input means of said gate means, said gate means producing said counter means reset signal in response to occurrence of said scan position signal concurrently with the aforementioned reset enable and reference signals.

2. The system according to claim 1 wherein said scan position signal is generated when said scan passes into the last quarter of the screen.

3. In a system including a raster scanned video monitor for displaying graphics and an image simultaneously on the monitor screen, video camera means operative to generate a sequence of analog video signals representative of the horizontal raster lines composing said image and means for coupling the analog signals to said monitor to effect display of the image represented by said signals, a first counter having an output and an input, a crystal controlled oscillator for generating clock pulses and having an output coupled to the input of the counter, the output of the counter providing digital values representative of the number of counts of said pulses from the oscillator, first sequencer means having input and output means, the input means coupled to the output of said counter and said sequencer means responding to addresses represented by said digital values by producing signals including horizontal blanking (H-BLANK) signals for controlling said video camers means, means for detecting zero crossings of ac power line-frequency and means responding to the detected zero crossings of said frequency by resetting said first counter, said H-BLANK signals shifting in time in correspondence with phase errors resulting from said detected zero crossings not occurring at constant intervals, means for displaying said graphics on said video monitor simultaneously with said image and including a phase-locked loop (PLL) for providing first and second timing signals for controlling the display of characters comprising said graphics, said PLL having an input for said shifted H-BLANK signals, an input for LOCK signals and a first and a second output for said first and said second timing signals, respectively, whose frequencies are proportional to the frequency of the shifted H-BLANK signals, a feedback circuit in said PLL coupled between the first output of said PLL and said LOCK signal input, said circuit including a resettable divide-by-N counter having an input coupled to the first output of the PLL and having an output providing digital signals corresponding to the count of said first timing signals from said PLL, said feedback circuit further including a second sequencer means having input means for said digital signals corresponding to said number of counts, said digital signals constituting addresses to said second sequencer means to produce said second timing signals including said LOCK signals that are coupled to said PLL input and including a reset disable signal of a first predetermined duration after each reset of the divide-by-N counter means followed respectively by a reset enable signal whose beginning and end defines a window of a second predetermined duration, if said shifted H-BLANK signals occur during said first predetermined duration then said PLL is allowed to correct for errors in the phase relationship between said shifted H-BLANK signal and said LOCK signals and said divide-by-N counter is not reset, means for generating a scan position signal indicative of the scan nearing the bottom portion of the raster on said monitor screen, and gate means having inputs for said shifted H-BLANK signal, said reset enable signal and said scan position signal, said gate means responding to all of said signals at said gate means inputs existing concurrently by producing a reset signal that is effective to reset said divide-by-N counter, resetting of said divide-by-N counter constituting the reference point in time from which display of said graphics on said monitor screen is to occur to thereby overcome the effect of the phase errors in said zero crossing times.

* * * * *